United States Patent [19]
Kleinhans et al.

[11] Patent Number: 5,938,275
[45] Date of Patent: Aug. 17, 1999

[54] SIDE PANEL ASSEMBLY FOR A MOTOR VEHICLE BODY

[75] Inventors: Klaus Kleinhans, Boeblingen; Martin Brodt, Renningen; Otto Rothfuss, Holzbronn; Sven Rogal, Aidlingen; Reinhard Determann, Herrenberg, all of Germany

[73] Assignee: Mercedes-Benz AG, Germany

[21] Appl. No.: 08/696,606

[22] Filed: Aug. 14, 1996

[30] Foreign Application Priority Data

Aug. 30, 1995 [DE] Germany ............... 195 31 874

[51] Int. Cl.$^6$ .................................................. B62D 25/20
[52] U.S. Cl. .................... 296/203.03; 296/191; 296/209
[58] Field of Search ........................... 296/203.03, 209, 296/29, 203.01, 197, 193, 188

[56] References Cited

U.S. PATENT DOCUMENTS

| 3,724,153 | 4/1973 | Wessells, III et al. ......... 296/203.03 |
| 3,776,589 | 12/1973 | Barenyi . |
| 4,252,364 | 2/1981 | Toyama et al. ............... 296/197 X |
| 4,552,400 | 11/1985 | Harasaki et al. .............. 296/193 X |
| 4,682,812 | 7/1987 | Hurten et al. ................. 296/188 X |
| 4,938,525 | 7/1990 | Yamauchi ..................... 296/188 X |
| 5,246,264 | 9/1993 | Yoshii . |
| 5,352,011 | 10/1994 | Kihara et al. ................. 296/203.03 |
| 5,443,297 | 8/1995 | Tanaka et al. ................ 296/203.03 |

FOREIGN PATENT DOCUMENTS

| 69 02 564 | 7/1969 | Germany . |
| 35 56 007 A1 | 1/1976 | Germany . |
| 27 12 084 | 9/1978 | Germany . |
| 28 29 608 | 3/1979 | Germany . |
| 29 31 467 | 2/1980 | Germany . |
| 47-10329 | 3/1972 | Japan . |
| 2-148879 | 12/1990 | Japan . |
| 406211160 | 8/1994 | Japan ................. 296/203.03 |
| 6-286651 | 10/1994 | Japan . |

*Primary Examiner*—Joseph D. Pape
*Attorney, Agent, or Firm*—Evenson, McKeown, Edwards & Lenahan, P.L.L.C.

[57] ABSTRACT

A side panel assembly for a passenger motor vehicle body is assembled of two side panel parts which complement one another at least in a side member area to a hollow profile which is visible to the outside and forms the side member. The side panel assembly extends at least from an A-column to a rear wheel mounting in the longitudinal direction of the vehicle to the rear. The assembly has a side panel structure as well as a side panel planking.

11 Claims, 5 Drawing Sheets

SIDE PANEL ASSEMBLY FOR A MOTOR VEHICLE BODY

BACKGROUND AND SUMMARY OF THE INVENTION

The present invention relates to a side panel assembly for a motor vehicle body which extends at least from an A-column to a rear wheel mounting in the longitudinal direction of the vehicle to the rear and has a side panel structure as well as a side panel planking connected therewith.

DE 29 31 467 C3 shows a rear side panel assembly for a passenger car which has an interior side panel part and an exterior side panel part serving as the planking. Several reinforcing elements are placed on the interior side panel part and are covered by the side panel planking serving as the exterior side panel part.

DE 27 12 084 A1 and U.S. Pat. No. 5,246,264 show one side panel assembly respectively consisting of two half shells which cover one another, in which case their column-shaped hollow-profile areas of the assemblies may be provided with inserted reinforcing sections.

It is an object of the present invention to provide a side panel assembly having a simply configured side panel planking and forms favorable structural conditions particularly for a side impact.

The foregoing object has been achieved in accordance with the present invention in that the side panel structure is constructed of two side panel parts which are assembled transversely to the longitudinal direction of the vehicle and which are each constructed in a half shell manner at least in a side member area. The side panel parts complement one another to form a hollow profile which constitutes the side member and replaces the side panel planking in this area. As a result favorable structural conditions are formed for the secure absorption of side impact loads.

The side panel assembly has another potential for a higher dimensioning. In addition, the side panel assembly has a simple configuration and can be manufactured at reasonable cost and is therefore particularly suitable for forming variants within a vehicle series. As the result of the skillfully selected structural conditions of the side panel assembly, a targeted dimensioning can be achieved which, in the case of identical side impact requirements, has weight advantages with respect to the prior art.

As the result of the solution according to the present invention, the side member is already formed by the side panel structure, that is, by the two interior side panel parts so that the side panel planking fitted on from the outside can be manufactured without a side member profile. Consequently, the side panel planking is easy to manufacture and can easily be placed on the side panel structure. In this case, the side panel structure is composed of an interior side panel part and an exterior side panel part which is used particularly for the reinforcement, in which case both side panel parts were joined beforehand to form a one-piece component.

Preferably, all three side panel parts, i.e., the interior side panel part and the exterior side panel part used for the reinforcement as well as the side panel planking closing off toward the outside are manufactured as one-piece sheet steel stampings. A high-expenditure welding-together of the respective side panel parts is eliminated as a result of this solution.

According to a further feature of the present invention, at least an exterior section of a rear wheel mounting is linked to the interior side panel part. Thus, either only an exterior or an exterior and an interior section of the rear wheel mounting are linked to the interior side panel. Thereby, the construction of the side panel assembly is further simplified.

In a further embodiment of the invention, the exterior side panel part has visible exterior shells of a lower A-column part adjoining the side member as well as of a B-column adjoining the side member. With this embodiment, the shape of the side panel planking is further simplified because the exterior side panel part of the side panel structure in a lower section of the A-column as well as in the area of the B-column already forms the shell of the motor vehicle body and a side panel planking is therefore not required in these areas.

In a still further embodiment of the invention, the side panel planking covers the remaining sections of the shell of the side panel. Therefore, on one hand, the side panel planking covers the side panel structure in the areas in which the side panel structure does not itself form the shell of the side panel assembly. Furthermore, the side panel planking contributes to the additional reinforcement of the side panel assembly because, in the area of the side panel planking, three profile layers are provided, specifically the interior side panel part, the exterior side panel part and the side panel planking.

BRIEF DESCRIPTION OF THE DRAWINGS

These and other objects, features and advantages of the present invention will become more readily apparent from the following detailed description when taken in conjunction with the accompanying drawings wherein.

DETAILED DESCRIPTION OF THE DRAWINGS

Figure 1:
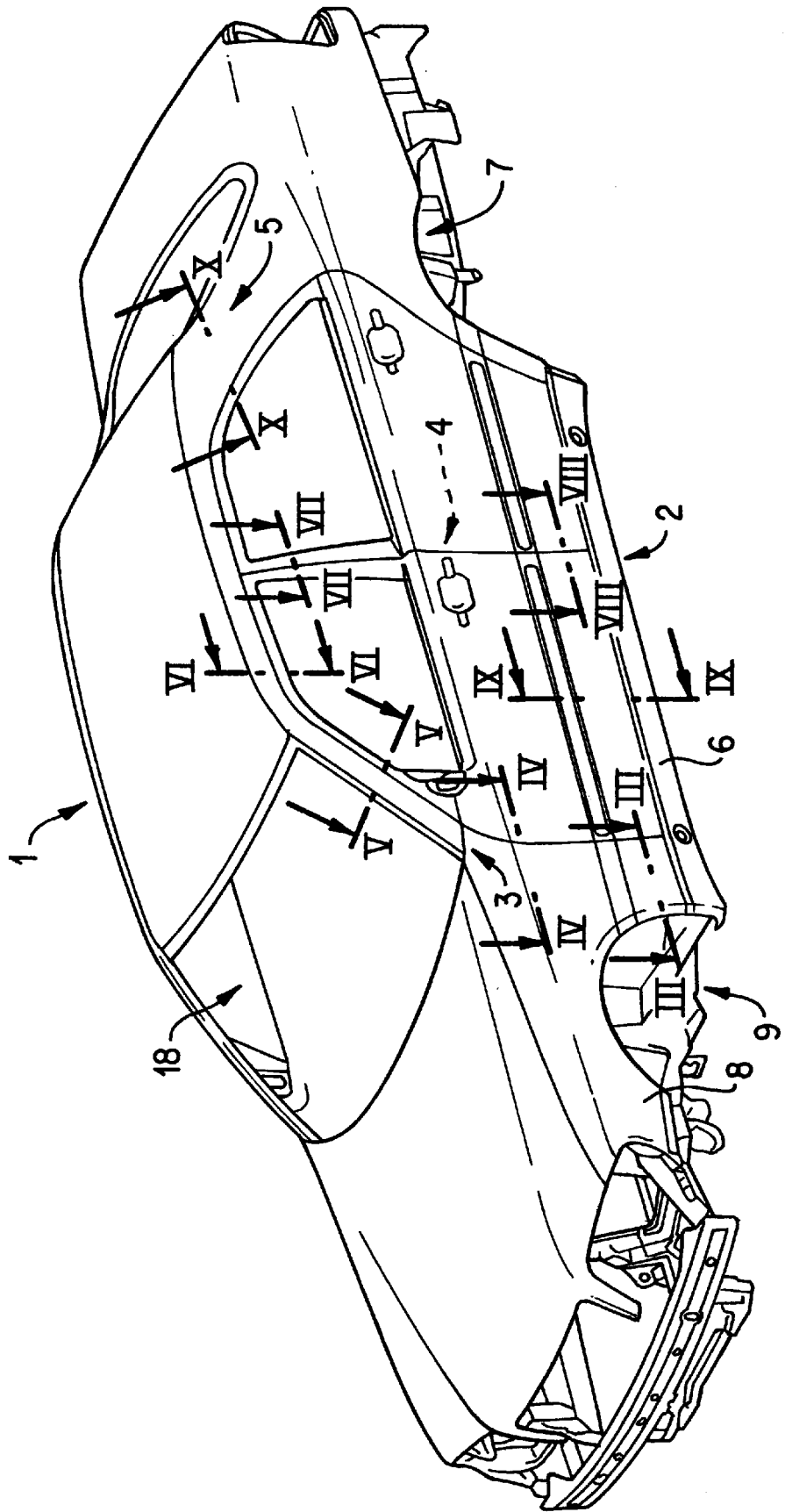
FIG. 1 is a perspective view of a motor vehicle body which is provided with an embodiment of a side panel assembly according to the present invention.

The motor vehicle body 1 shown in FIG. 1 has a self-supporting body support structure and is preferably provided for a four-door passenger car. On each side, the motor vehicle body 1 has two side doors which, however, are not part of the side panel assembly according to the present invention. On each side of the motor vehicle body 1, one side panel assembly designated generally by the numeral 2 extends from an A-column 3 by way of a B-column 4 and a C-column 5 to a rear wheel mounting 7.

In addition, the side panel assembly 2 has a rear fender on each side. In contrast, however, the two front fenders 8 are not contained in the side panel assemblies (FIGS. 2a and 2b) described in detail below. A front wheel mounting 9 on each side of the motor vehicle body 1 is also not part of the side panel assembly. In the downward direction, the side panel assembly 2 is closed off by a side member 6 and, in the upward direction, by a roof frame.

Figure 2A:
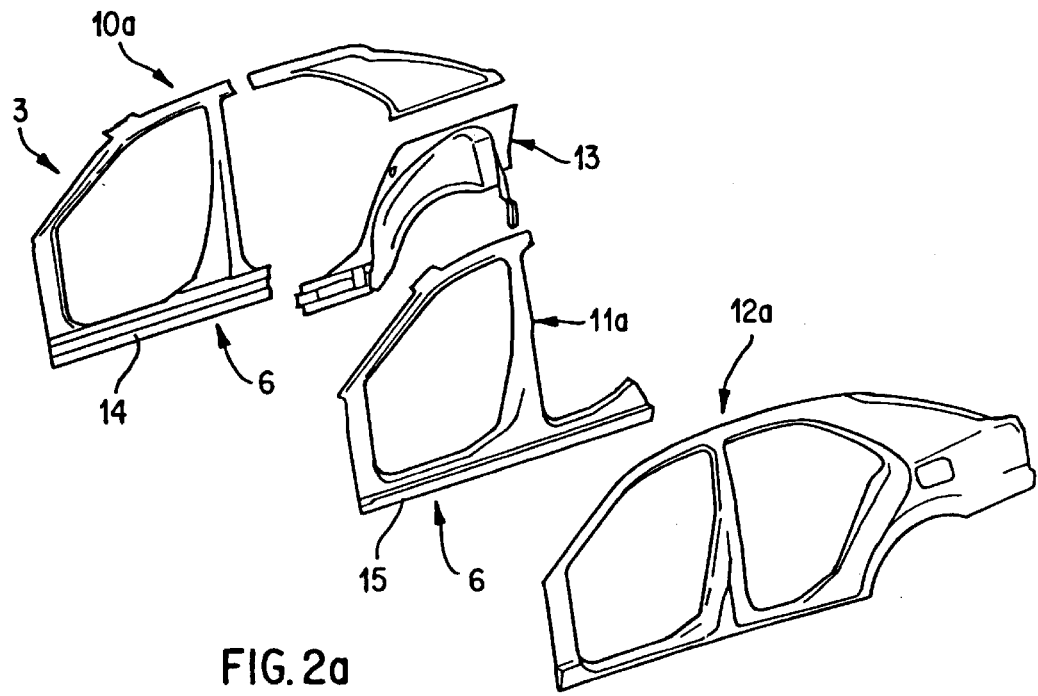
FIG. 2a is an exploded view of the construction of a first embodiment of a side panel assembly according to the present invention.
Figure 2B:
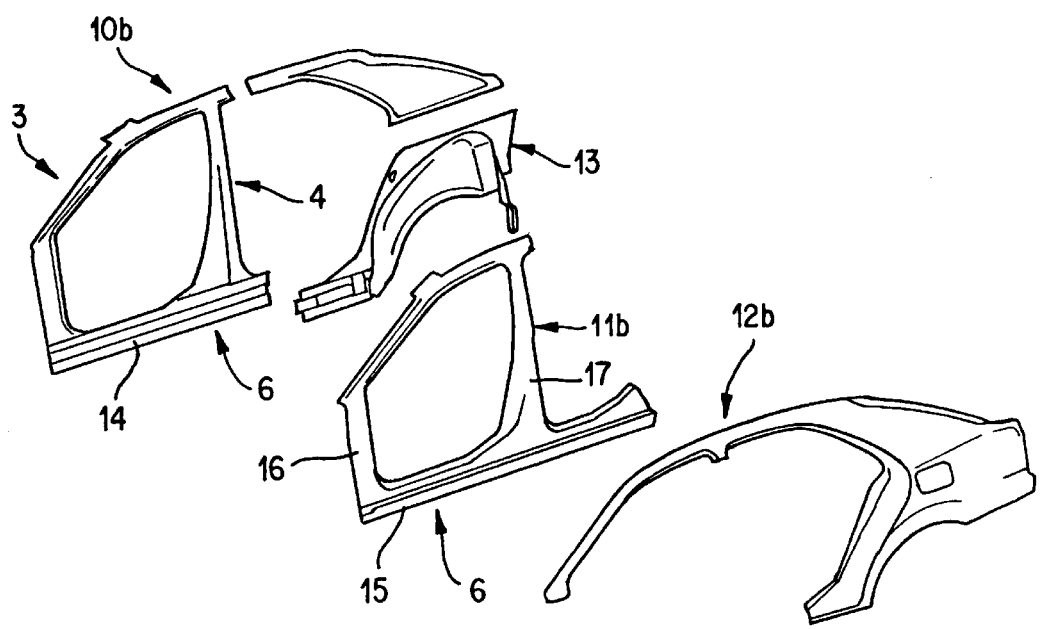
FIG. 2b is another exploded view of an embodiment of a second side panel assembly according to the present invention.
Figure 3A:
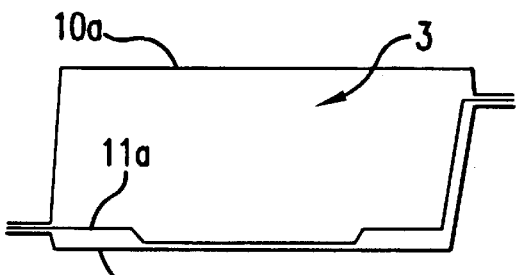
FIG. 3a is a sectional view of the side panel assembly of FIG. 2a in the area of the intersection line III—III in FIG. 1.
Figure 3B:
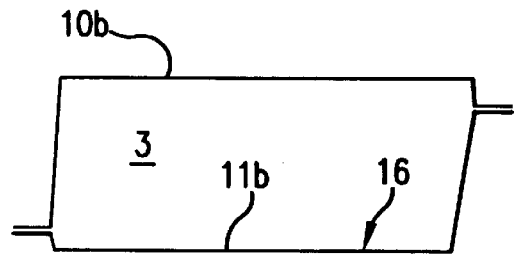
FIG. 3b is another schematic sectional view of the profile of the side panel assembly of FIG. 2b along the intersection line III—III in FIG. 1.
Figure 4A:
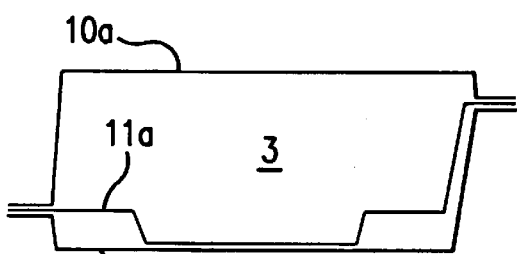
FIG. 4a is a sectional view of the side panel assembly of FIG. 2a along intersection line IV—IV in FIG. 1.
Figure 4B:
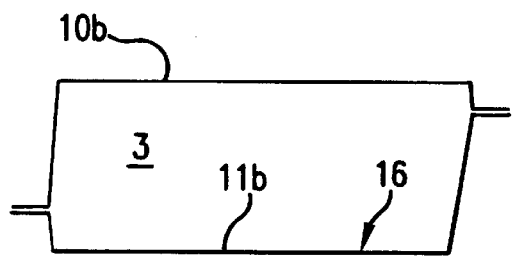
FIG. 4b is a schematic sectional view of the side panel assembly according to FIG. 2b along intersection line IV—IV in FIG. 1.
Figure 5:
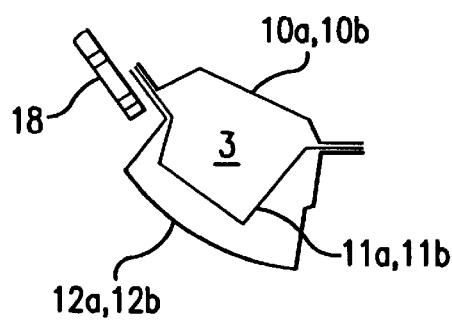
FIG. 5 is a sectional view of the side panel assembly of the motor vehicle body along intersection line V—V of FIG. 1, at the level of which both variants of the side panel assemblies according to FIGS. 2a and 2b have an identical configuration.
Figure 6:
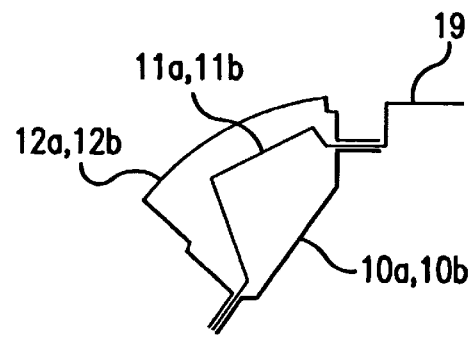
FIG. 6 is another sectional view of the motor vehicle body along intersection line VI—VI in FIG. 1.
Figure 7A:
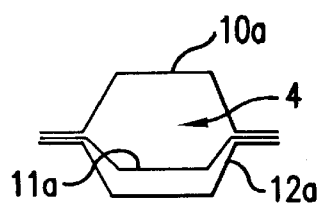
FIG. 7a is a sectional view of the motor vehicle body corresponding to the configuration of the side panel assembly according to FIG. 2a along intersection line VII—VII in FIG. 1.
Figure 7B:
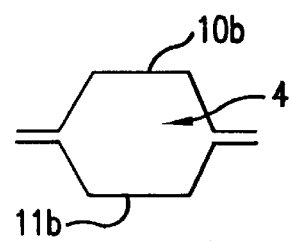
FIG. 7b is another sectional view along intersection line VII—VII in FIG. 1 of the second side panel assembly according to FIG. 2b.
Figure 8A:
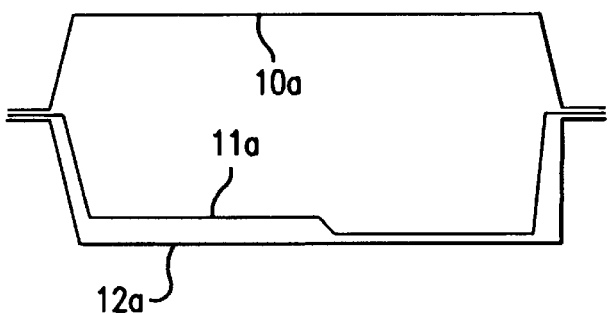
FIG. 8a is a sectional view of the side panel assembly according to FIG. 2a along intersection line VIII—VIII in FIG. 1.
Figure 8B:
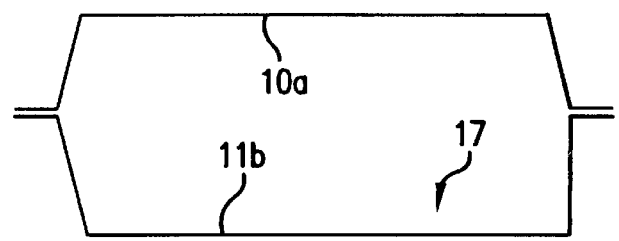
FIG. 8b is another sectional view along intersection line VIII—VIII in FIG. 1, but for the side panel assembly according to FIG. 2b.
Figure 9A:
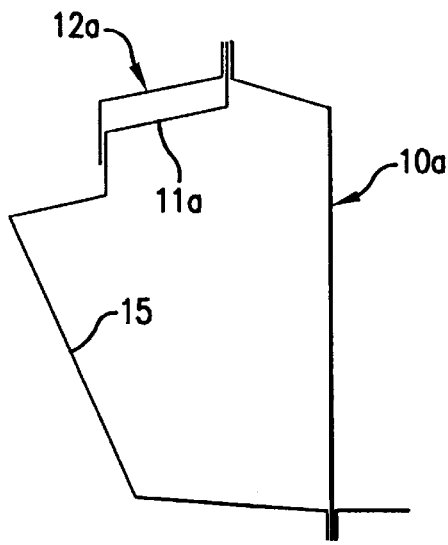
FIG. 9a is a sectional view of the side member area of the side panel assembly according to FIG. 2a in the area of the intersection line IX—IX in FIG. 1.
Figure 9B:
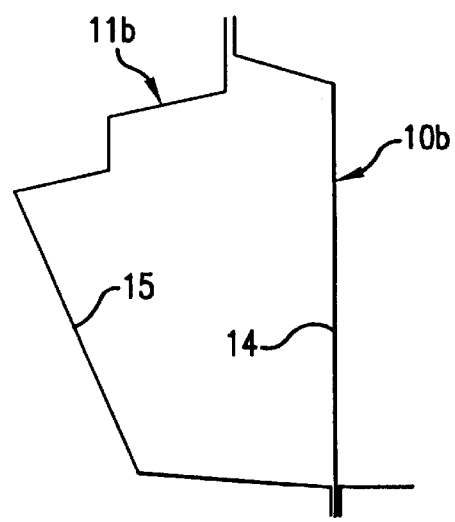
FIG. 9b is a schematic sectional view of the side member area of the side panel assembly according to FIG. 2b also along intersection line IX—IX in FIG. 1.
Figure 10:
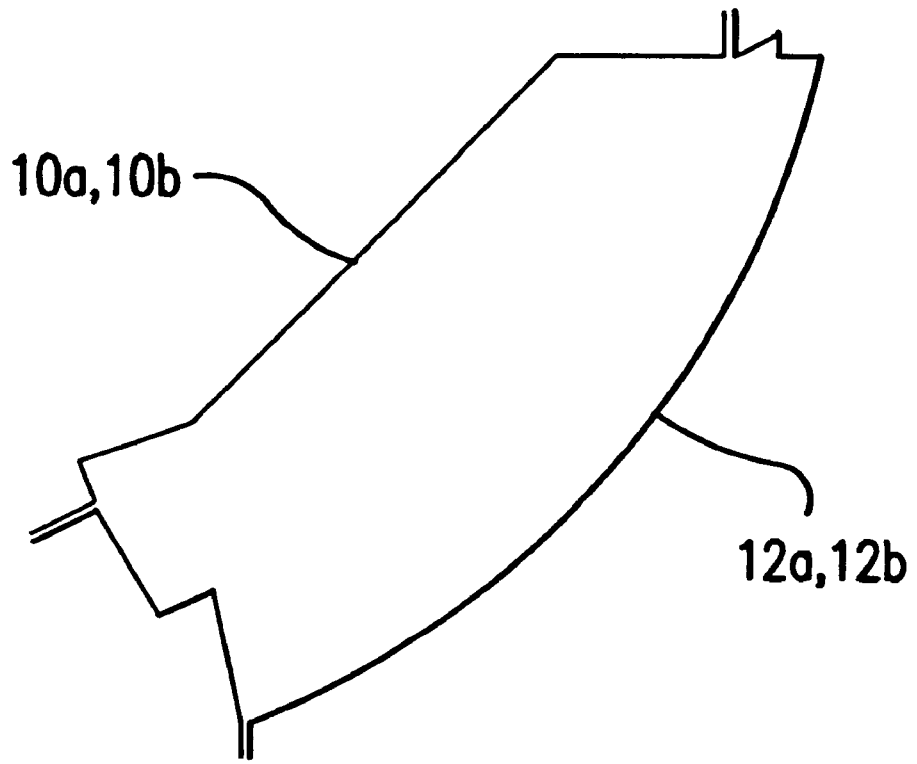
FIG. 10 is a sectional view of the motor vehicle body in the area of the intersection line X—X in FIG. 1.

In the following, two variants of side panel assemblies will be described in detail and illustrated in FIGS. 2a and 2b. Both side panel assemblies can be used as alternatives of the side panel assembly 2 in the motor vehicle body 1 of FIG. 1. The side panel assembly of FIG. 2a is illustrated in the figures provided with the letter a, and the side panel assembly of FIG. 2b is illustrated in the figures having the letter b. The sectional representations whose figure numbers are not characterized by the letters a or b apply to both embodiments of the side panel assemblies. Depending on the illustrated embodiments of the side panel assemblies, the reference numbers are also provided with the letters a or b. The reference numbers which are not provided with a letter represents part or sections of the side panel assembly which are identical for both side panel assemblies.

The side panel assembly shown in FIG. 2a has an interior side panel part 10a which is produced as a one-piece sheet steel stamping, represents the interior part of the side panel structure and extends from an A-column 3 into the rear fender area. The door cutouts for the two side doors are formed by the interior side panel part 10a. In an area directly behind the C-column, an exterior wheel mounting half 13 is welded to the interior side panel part 10a. In its side member area, the interior side panel part 10a has a half-shell-type profile 14 below the two door cutouts. The profile 14 forms the interior profile half for the side member 6.

Side panel part 11a is also produced as a one-piece sheet steel stamping and forms a door cutout for the front side panel door, in that it forms the corresponding profile areas to the side panel part 10a for the A-column 3, the front roof frame part and the B-column 4. In addition, along the entire length of the side member area, the side panel part 11a has the pertaining exterior profile half 15 of the side member 6 so that the two profile halves 14 and 15 complement one another when the side panel part 11a is placed on the side panel part 10a to form a closed stable hollow profile.

The profile half 15 of the side member 6 on the side panel part 11a already represents the side member area of the shell of the motor vehicle body 1 which is visible to the outside, so that no further planking need be applied in this area. Correspondingly, the side panel planking 12a is also saved which is placed from the outside onto the two side panel parts 10a, 11a already joined together to form a side panel structure. The schematic profile course of the two side panel parts 10a, 11a as well as of the side panel planking 12a can be recognized by FIGS. 3a, 4a, 5, 6, 7a, 8a, 9a and 10.

In the side panel assembly of FIG. 2b, the interior side panel part 10b corresponds to the side panel part 10a according to FIG. 2a. Only the side panel part 11b serving as the integral reinforcement and the side panel planking 12b have a different configuration. In the side panel part 11b, the profile half 15, as in the case of the side panel part 11a, forms the outer shell of the side member 6. Also, a lower A-column section 16 of the A-column 3 and a B-column area 17 of the B-column 4 are constructed as the corresponding profile shell half to the corresponding sections of the side panel part 10b. As a result a hollow profile is formed in the lower vertical A-column section 16 as well as along the entire height of the B-column 4 by way of the B-column area 17, the B-column area 17 and the A-column section 16 forming the exterior shell of the side panel assembly. As the result of the fact that these sections 16, 17 form the exterior sides of the side panel assembly 2, the side panel planking 12b has a correspondingly simpler configuration in that it is saved in the area of the B-column 4 and in the area of the lower section of the A-column 3.

FIG. 2b clearly illustrates the configuration of the side panel planking 12b which is placed from the outside onto the two joined side panel parts 10b, 11b. The schematic profile course along the entire length and height of the side panel parts 10b and 11b and of the side panel planking 12b in the side panel assembly 2 according to FIG. 1 is explained by FIGS. 3b, 4b, 5, 6, 7b, 8b, 9b and 10. Also in the case of side panel part 10b, the exterior wheel mounting half 13 is welded on the side panel part 10b in a manner identical to that of side panel part 10a. Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A side panel assembly for a body of a motor vehicle extending at least from an A-column to a rear wheel mounting area in a longitudinal direction of the motor vehicle toward the rear thereof, comprising a side panel structure consisting of two side panel parts assembled transversely to the longitudinal direction of the motor vehicle, the two side panel parts being constructed at least in an area below cut-outs for at least one vehicle door in a half-shell-like manner and complementing one another to provide a hollow profile forming a side member, and an exterior-facing side panel planking extending over the side panel parts except along a profile half of the side panel parts such that the profile half is visible from the outside of the vehicle.

2. The side panel assembly according to claim 1, wherein at least an exterior section of the rear wheel mounting area is connected to one of the side panel parts.

3. The side panel assembly according to claim 1, wherein an exterior one of the side panel parts has visible exterior shells of a lower A-column part adjoining the side member and of a B-column adjoining the side member.

4. The side panel assembly according to claim 3, wherein at least an exterior section of the rear wheel mounting area is connected to an interior one of the side panel parts.

5. The side panel assembly according to claim 1, wherein the side panel assembly comprises body shell sections arranged to be covered by the side panel planking.

6. The side panel assembly according to claim 5, wherein at least an exterior section of the rear wheel mounting areas is connected to one of the side panel parts.

7. The side panel assembly according to claim 5, wherein an exterior one of the side panel parts has visible exterior shells of a lower A-column part adjoining the side member and of a B-column adjoining the side member.

8. The side panel assembly according to claim 7, wherein at least an exterior section of the rear wheel mounting area is connected to an interior one of the side panel parts.

9. The side panel assembly according to claim 5, wherein the side panel planking is a one-piece component.

10. The side panel assembly according to claim 9, wherein at least an exterior section of the rear wheel mounting area is connected to one of the side panel parts.

11. The side panel assembly according to claim 10, wherein an exterior one of the side panel parts has visible exterior shells of a lower A-column part adjoining the side member and of a B-column adjoining the side member.

\* \* \* \* \*